(12) United States Patent
Allgulin

(10) Patent No.: US 9,884,287 B2
(45) Date of Patent: Feb. 6, 2018

(54) METHOD AND ARRANGEMENT FOR REMOVING GASEOUS ELEMENTARY MERCURY FROM A STREAM OF GAS

(71) Applicant: OUTOTEC (FINLAND) OY, Espoo (FI)

(72) Inventor: Torkel Allgulin, Stockholm (SE)

(73) Assignee: OUTOTEC (FINLAND) OY, Espoo (FI)

(*) Notice: Subject to any disclaimer, the term of this patent is extended or adjusted under 35 U.S.C. 154(b) by 0 days.

(21) Appl. No.: 15/111,060

(22) PCT Filed: Jan. 27, 2015

(86) PCT No.: PCT/FI2015/050052
§ 371 (c)(1),
(2) Date: Jul. 12, 2016

(87) PCT Pub. No.: WO2015/114212
PCT Pub. Date: Aug. 6, 2015

(65) Prior Publication Data
US 2016/0339384 A1 Nov. 24, 2016

(30) Foreign Application Priority Data
Jan. 28, 2014 (FI) ...................................... 20145091

(51) Int. Cl.
*B01D 53/64* (2006.01)
*B01D 53/75* (2006.01)
(Continued)

(52) U.S. Cl.
CPC ............. *B01D 53/64* (2013.01); *B01D 53/04* (2013.01); *B01D 53/1493* (2013.01);
(Continued)

(58) Field of Classification Search
CPC ........ B01D 53/64; B01D 53/75; B01D 53/78; B01D 2251/108; B01D 2257/60; B01D 2257/602; B01D 2258/0283
See application file for complete search history.

(56) References Cited

U.S. PATENT DOCUMENTS 3,786,619 A 1/1974 Melkersson
3,849,537 A 11/1974 Allgulin
(Continued)

FOREIGN PATENT DOCUMENTS

DE 42 41 726 C1 3/1994
EP 0 064 962 A1 11/1982
(Continued)

OTHER PUBLICATIONS

International Search Report (PCT/ISA/210) dated Apr. 10, 2015, by the European Patent Office as the International Searching Authority for International Application No. PCT/FI2015/050052.
(Continued)

*Primary Examiner* — Timothy C Vanoy
(74) *Attorney, Agent, or Firm* — Buchanan, Ingersoll & Rooney PC (57) ABSTRACT

The invention relates to a method and to an arrangement for removing gaseous elementary mercury from a stream of gas and to an arrangement for carrying out the method. The arrangement comprises a first washing tower (2) for receiving a stream of gas, a second washing tower (6) for receiving a stream of once processed gas (5) from the first washing tower (2), and a third washing tower (9) for receiving a stream of twice processed gas (23) from the second washing tower (6) and configured for discharging a stream of cleaned gas (12).

25 Claims, 6 Drawing Sheets

(51) Int. Cl.
    *B01D 53/78*    (2006.01)
    *B01D 53/04*    (2006.01)
    *B01D 53/14*    (2006.01)

(52) U.S. Cl.
    CPC .......... *B01D 53/78* (2013.01); *B01D 2252/30* (2013.01); *B01D 2253/102* (2013.01); *B01D 2253/112* (2013.01); *B01D 2257/602* (2013.01)

(56) References Cited

U.S. PATENT DOCUMENTS

| | | |
|---|---|---|
| 4,233,274 A | 11/1980 | Allgulin |
| 4,640,751 A | 2/1987 | Dyvik et al. |
| 8,877,148 B2 * | 11/2014 | Dickson ................ B01D 53/64 423/190 |
| 2003/0099585 A1 | 5/2003 | Allgulin |
| 2010/0296993 A1 | 11/2010 | Hunsinger et al. |

FOREIGN PATENT DOCUMENTS

| | | | |
|---|---|---|---|
| EP | 0 487 834 A1 | 6/1992 | |
| EP | 3099399 A1 * | 12/2016 | ............ B01D 53/64 |
| GB | 2 098 186 A | 11/1982 | |
| WO | WO 98/53900 A1 | 12/1998 | |
| WO | WO 2011/009217 A1 | 1/2011 | |

OTHER PUBLICATIONS

Written Opinion (PCT/ISA/237) dated Apr. 10, 2015, by the European Patent Office as the International Searching Authority for International Application No. PCT/FI2015/050052.

* cited by examiner

METHOD AND ARRANGEMENT FOR REMOVING GASEOUS ELEMENTARY MERCURY FROM A STREAM OF GAS

FIELD OF THE INVENTION

The invention relates to a method for removing gaseous elementary mercury from a stream of gas as defined in the preamble of independent claim 1.

The invention also relates to an arrangement method for removing gaseous elementary mercury from a stream of gas as defined in the preamble of independent claim 14.

The invention relates also to an arrangement for carrying out the method.

The demand on low contents of mercury in sulphidic acid produced from gases produced in the roasting of sulphidic ores has increased. In the past, a mercury content of 1 mg/kg in the acid was regarded a satisfactorily, but nowadays a mercury content of below 0.2 mg/kg is becoming a more frequent demand. Therefore, it is of importance to develop gas cleaning methods and arrangements for removing and recovering mercury from gases produced in the roasting of sulphidic ores, which fulfills the demands of today. The presented method and arrangement can however also be used for removing and recovering mercury from other gases.

One process for removing mercury from gases in the metallurgical field is known as the "Boliden-Norzink Process". Embodiments of this process is described for example in publications U.S. Pat. No. 3,849,537, U.S. Pat. No. 4,233,274, and U.S. Pat. No. 4,640,751.

Publication U.S. Pat. No. 4,233,274 presents a method of extraction of mercury from gases containing gaseous elementary mercury comprising treating said gases in a closed circuit with an aqueous solution containing 0.1-300 mmol/l mercury (II)-ions and at least double that content of ions with the ability to form soluble complexes with mercury (II)-ions whereafter mercury absorbed in solution is recovered and the solution recirculated.

By adding a selenium filter after the Boliden-Norzink process, the mercury content can be reduced to lower values.

Publication U.S. Pat. No. 3,786,619 presents a method of purifying gases containing gaseous mercury. Mercury containing gas is passed through a mass of purifying material containing as an active constituent a material consisting of selenium, selenium sulphide or other selenium compounds or mixtures thereof.

Publication US 2003/099585 presents a method of an essentially complete elimination of remaining traces of mercury in gases, such as roaster gases containing $SO_2$, and which have been treated in a chloride washer for removing elementary Hg, characterized in that the gas is introduced to a scrubber plant where the same is washed with a washing solution such that any content of gaseous $HgCl_2$ in the gas is absorbed by the washing solution, that the gas is subjected to a turbulent and mechanical action in the scrubber so as to physically put together any Hg, $HgCl_2$ and $Hg_2Cl_2$ and other compounds of Hg present in particle or drop form into bigger aggregates or agglomerates and that thus formed aggregates or agglomerates and present bigger particles are brought to be separated from the gas and then be collected and removed. The treated gas may be brought to a filter having selenium as an active compound for the absorption of any remaining gaseous elementary Hg.

The price of selenium has however drastically increased over the years. This makes the selenium filter an expensive option, since the filter mass has to be changed on a regular basis.

Publication GB 2 098 186 presents removal of Hg from $SO_2$-bearing gas.

OBJECTIVE OF THE INVENTION

The object of the invention is to provide an effective method and arrangement for removal of gaseous elementary mercury from a stream of gas.

SHORT DESCRIPTION OF THE INVENTION

The method of the invention is characterized by the definitions of independent claim 1.

Preferred embodiments of the method are defined in the dependent claims 2 to 13.

The arrangement of the invention is correspondingly characterized by the definitions of independent claim 14.

Preferred embodiments of the arrangement are defined in various dependent claims.

The arrangement for carrying out the method of the invention and preferred embodiments thereof are described below.

The invention is based on the existing Boliden Norzink process but provides an improved method and arrangement for the scrubbing section.

The method and the arrangement minimize the risk of formation of calomel vapor in the process.

The method and the arrangement provides for efficient removal of mercury without the need of using filters such as filters comprising selenium.

LIST OF FIGURES

In the following the invention will described in more detail by referring to the figures, of which

DETAILED DESCRIPTION OF THE INVENTION

The figures show examples of methods and arrangements for removing gaseous elementary mercury from a stream of gas.

First the method for removing gaseous elementary mercury ($Hg^0(g)$) from a stream of gas and some preferred embodiment and variants of the method will be described in greater detail.

The method comprises feeding the stream of gas 1 into a first washing tower 2.

The method comprises treating the stream of gas 1 in the first washing tower 2 with a first washing solution 3 that circulates in a first closed system 4 through the first washing tower 2 and that contains mercury (II) ions and possible additionally at least twice this amount of ion or ions selected from the group consisting of chlorine, bromine, iodine, cyanide and rhodanide ions to form a stream of once processed gas 5 of the stream of gas 1.

In this first stage of the method that is performed in the first washing tower 2, the major part of the mercury vapor ($Hg^o$) in the gas is removed. The mercury (II)-ion ($Hg^{2\pm}$) content in the first washing solution 3 may be decreased compared to a minimum often recommended level of about 1 to about 2 g/l, such as less than about 1.5 g/l, for the so-called Boliden-Norzink process but may be above a certain minimum level of about 0.1 to about 0.3 g/l, such as more than about 0.2 g/l. This will reduce the risk for formation of mercuric chloride ($Hg_2Cl_2$) mist or calomel mist in the gas.

The main reaction in this first washing stage of the method that is performed in the first washing tower 2 is the following:

$Hg^o(g) + HgCl^{n-}_{(2+n)} \rightarrow Hg_2Cl_2(s) + nCl^-$, where $0 \leq n \leq 2$ The method comprises feeding a stream of once processed gas 5 from the first washing tower 2 into a second washing tower 6.

The method comprises treating the stream of once processed gas 5 in the second washing tower 6 with a second washing solution 7 circulating in a second closed system 8 through the second washing tower 6 and that contains a higher concentration of mercury (II)-ions than the first washing solution 3, such as more than about 1 to about 2 g/l, such as more than about 1.5 g/l, of mercury (II)-ions, and possible additionally at least twice this amount of ion or ions selected from the group consisting of chlorine, bromine, iodine, cyanide and rhodanide ions to form a stream of twice processed gas 23 of the stream of once processed gas 5.

In this second stage of the method, the amount of mercury vapor ($Hg^o$) will be decreased to very low values.

The main reaction in this second washing stage of the method that is performed in the second washing tower is the following:

$Hg^o(g) + HgCl^{n-}_{(2+n)} \rightarrow Hg_2Cl_2(s) + nCl^-$, where $0 \leq n \leq 2$ The method comprises feeding a stream of twice processed gas 23 from the second washing tower 6 into a third washing tower 9.

The method comprises treating the stream of twice processed gas 23 in the third washing tower 9 with a third washing solution 10 circulating in a third closed system 11 through the third washing tower 9 and that contains a lower concentration of mercury (II)-ions than the first washing solution 3, such as less that about 0.1 to about 0.3 g/l, such as such as less than about 0.2 g/l, of mercury (II)-ions, and possible additionally at least twice this amount of ion or ions selected from the group consisting of chlorine, bromine, iodine, cyanide and rhodanide ions to form a stream of cleaned gas (12) of the stream of twice processed gas (23).

In this third stage of the method that is performed in the third washing tower 9, the mercuric chloride ($Hg_2Cl_2$) vapor that is formed in the second washing tower 6 is removed from the gas. It is important to avoid reduction of $Hg^{2+}$ to $Hg^o$ and this may be achieved by careful control of the Hg concentration in the third washing solution 10, which is not allowed to exceed a certain maximum level of about 10 mg/l.

The main reaction in this third washing stage of the method that is performed in the third washing tower 9 is the following:

$HgCl_2(g) + H_2O \rightarrow HgCl_2(a)$

The method comprises discharging a stream of cleaned gas 12 from the third washing tower 9.

The method may include feeding additional washing solution 13 containing mercury (II)-ions from a tank means 14 into first washing solution 3 circulating in the first closed system 4.

The method may include removing calomel 15 from the first washing solution 3 circulating in the first closed system 4.

The method may include feeding a part 16 of the second washing solution 7 circulating in the second closed system 8 from the second closed system 8 into first washing solution 3 circulating in the first closed system 4.

The method may include feeding additional washing solution 13 containing mercury (II)-ions from a tank means 14 into the second washing solution 7 circulating in the second closed system 8.

The method may include filtering out mercury from the third washing solution 10 circulating in the third closed system 11.

The method may include feeding third washing solution 21 circulating in the third closed system 11 to process steps (not shown in the figure) which are performed prior the method as described here. By such feeding, the amount of third washing solution 21 will be lower and it will be easier to maintain an optimal chemical composition of the third washing solution 21.

Figure 1:
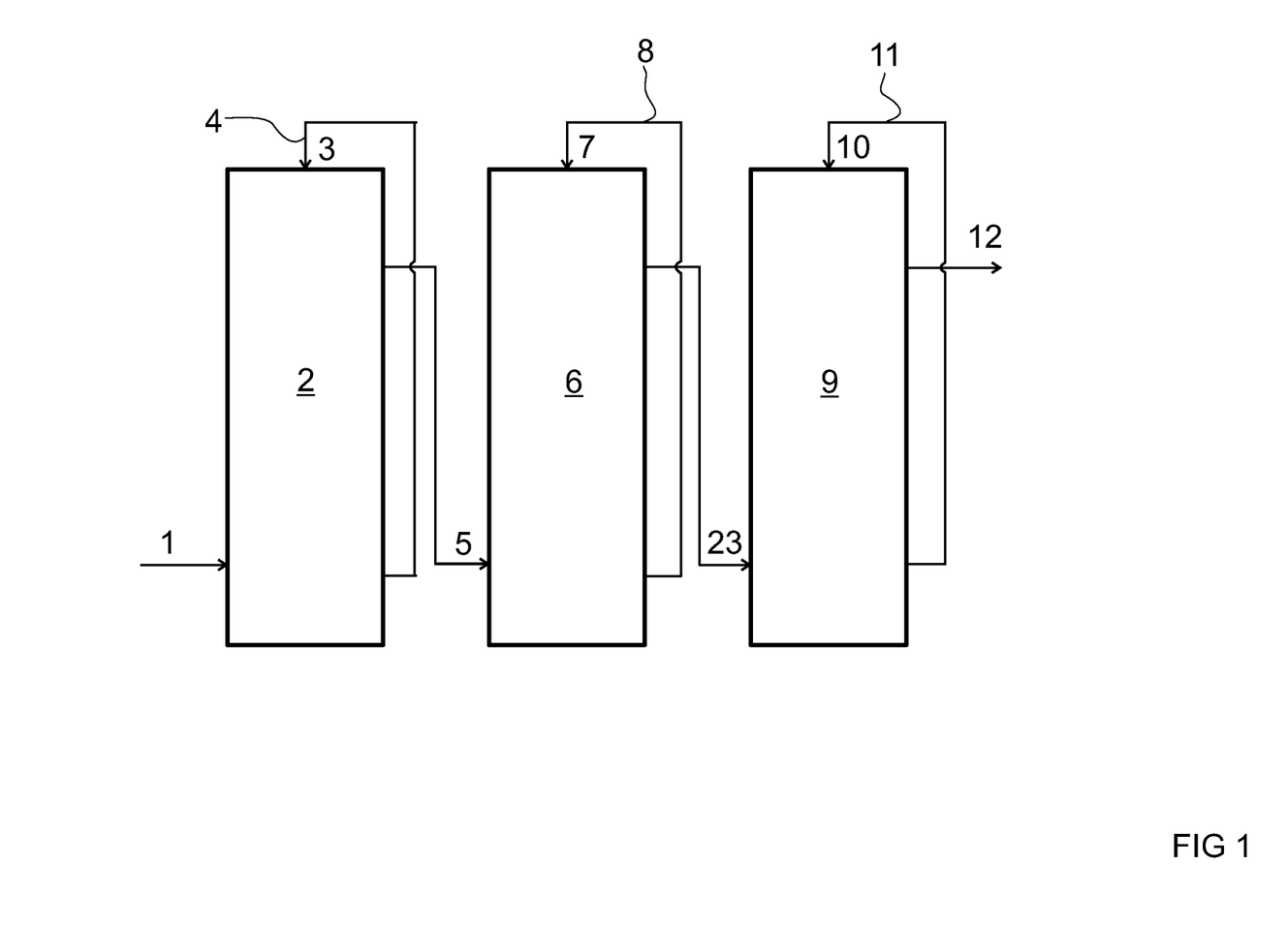
FIG. 1 is a schematic presentation of a first embodiment of the arrangement.
Figure 2:
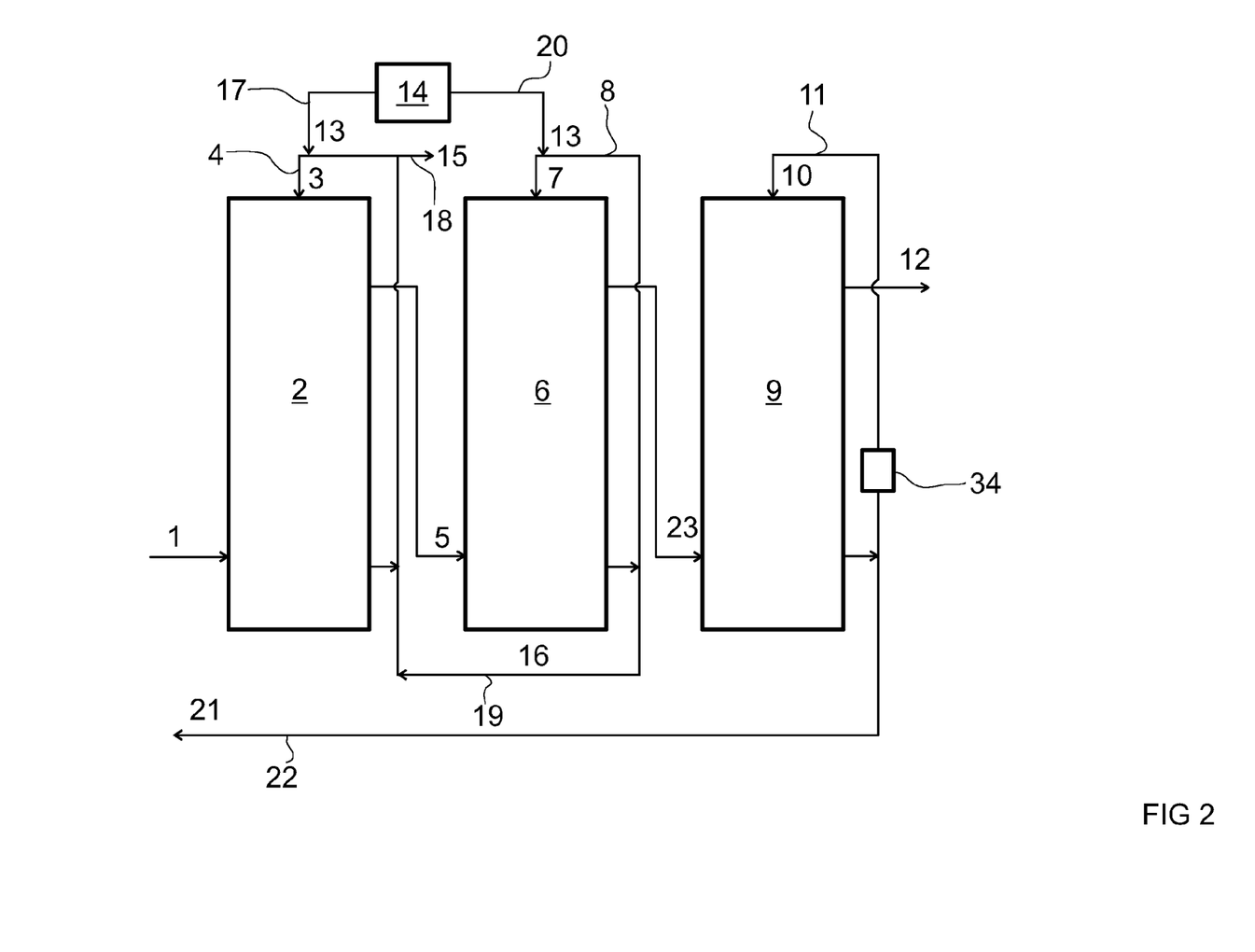
FIG. 2 is a schematic representation of a second embodiment of the arrangement.
Figure 3:
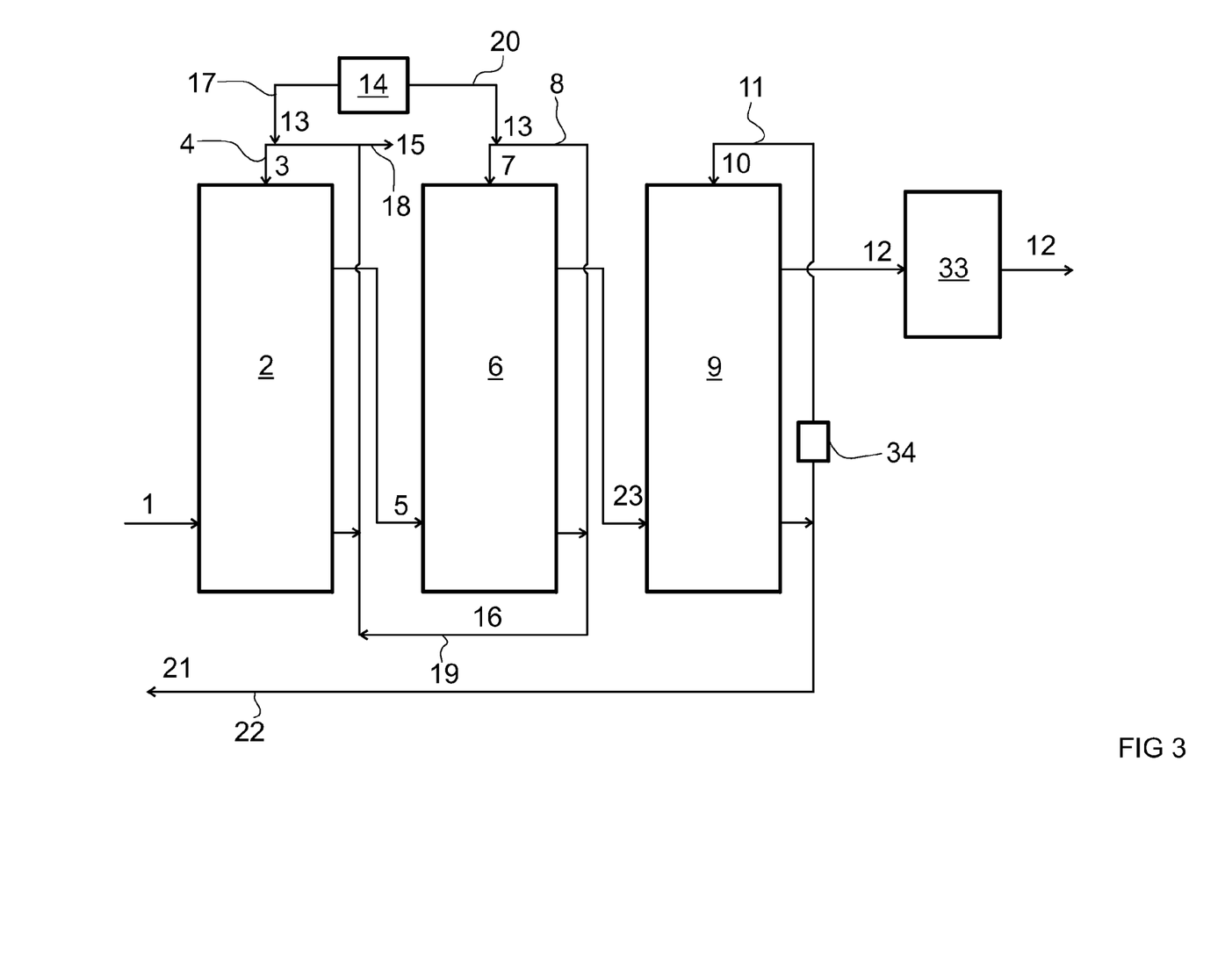
FIG. 3 is a schematic representation of a third embodiment of the arrangement.
Figure 4:
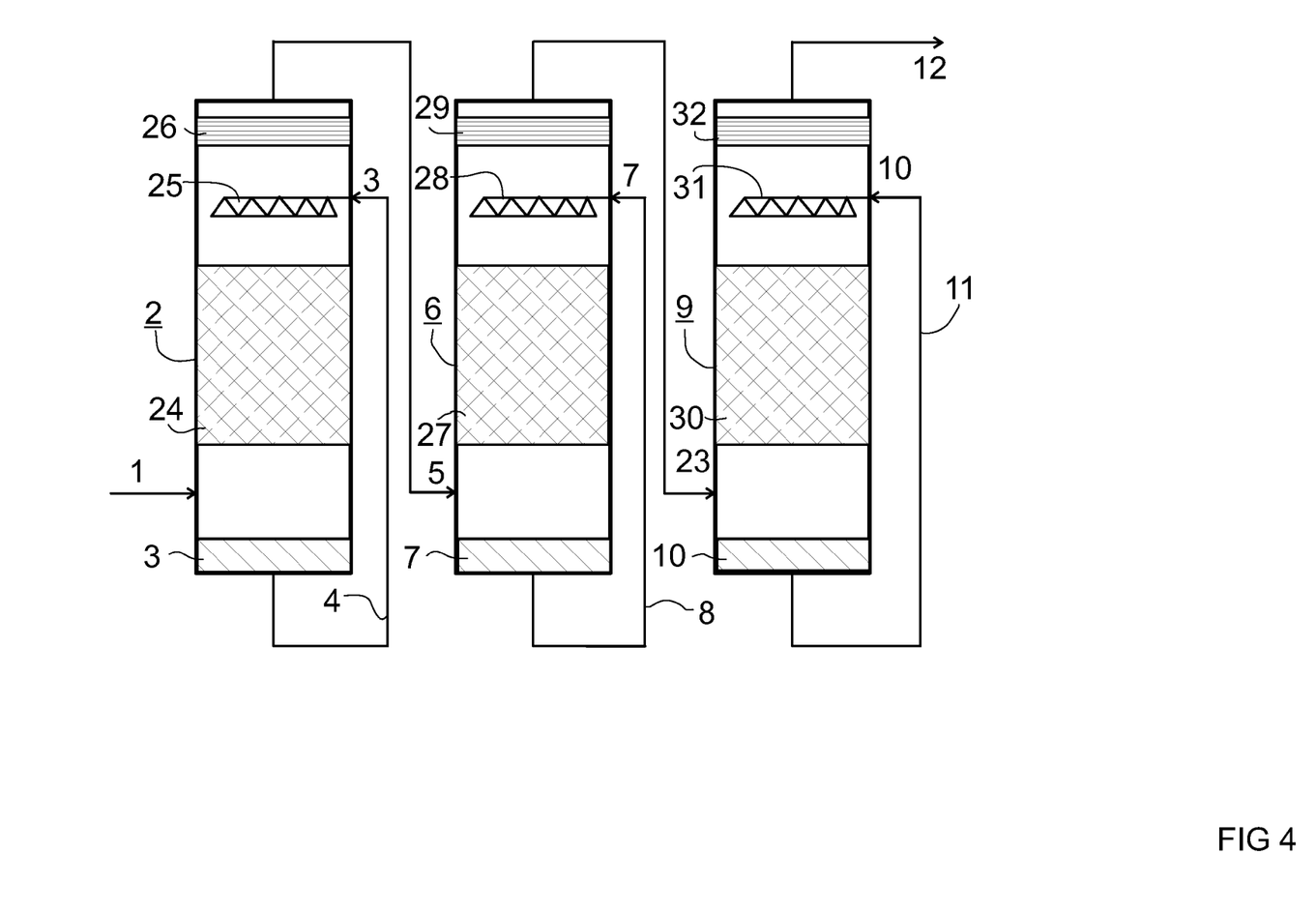
FIG. 4 is a schematic representation of a fourth embodiment of the arrangement.
Figure 5:
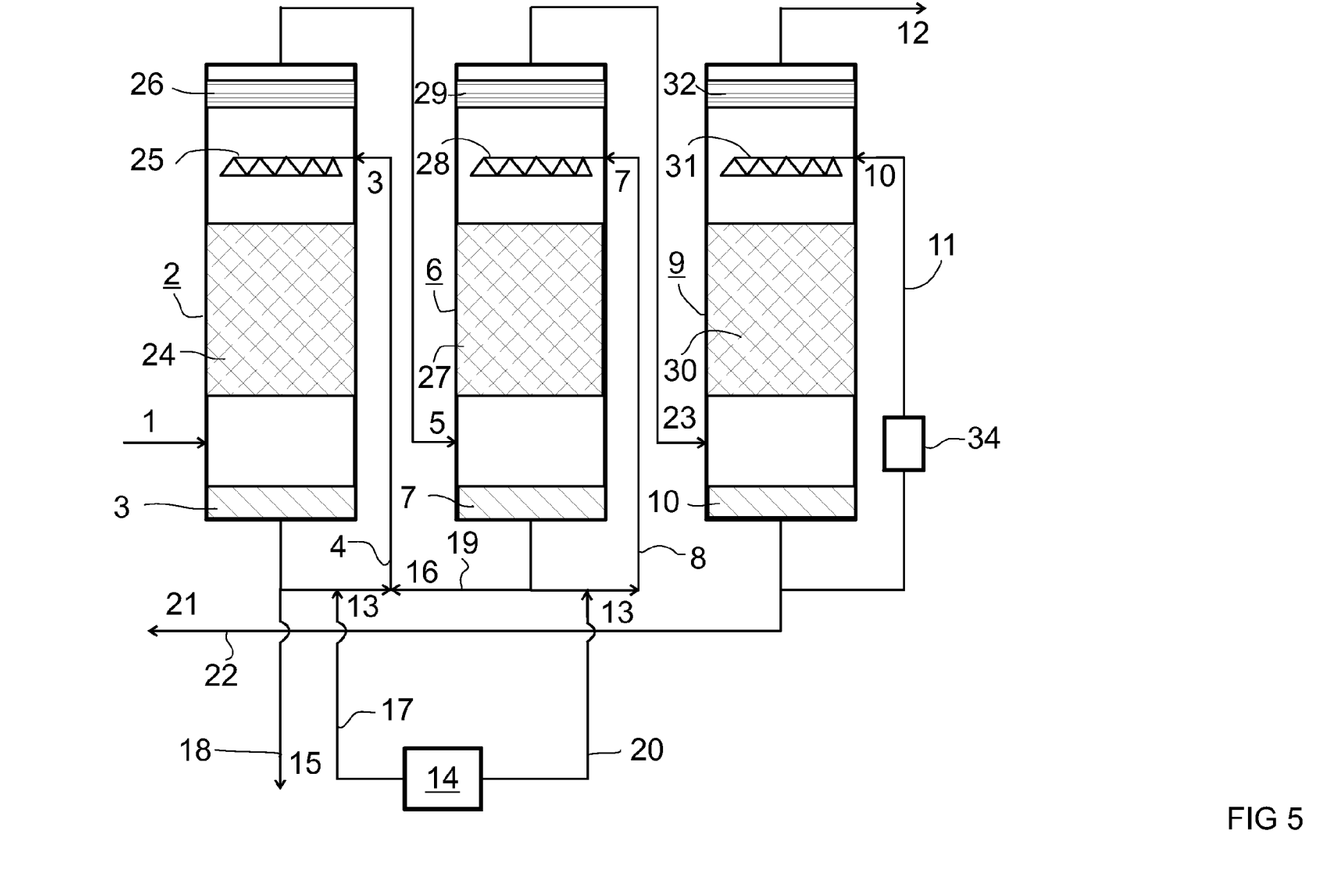
FIG. 5 is a schematic representation of a fifth embodiment of the arrangement.
Figure 6:
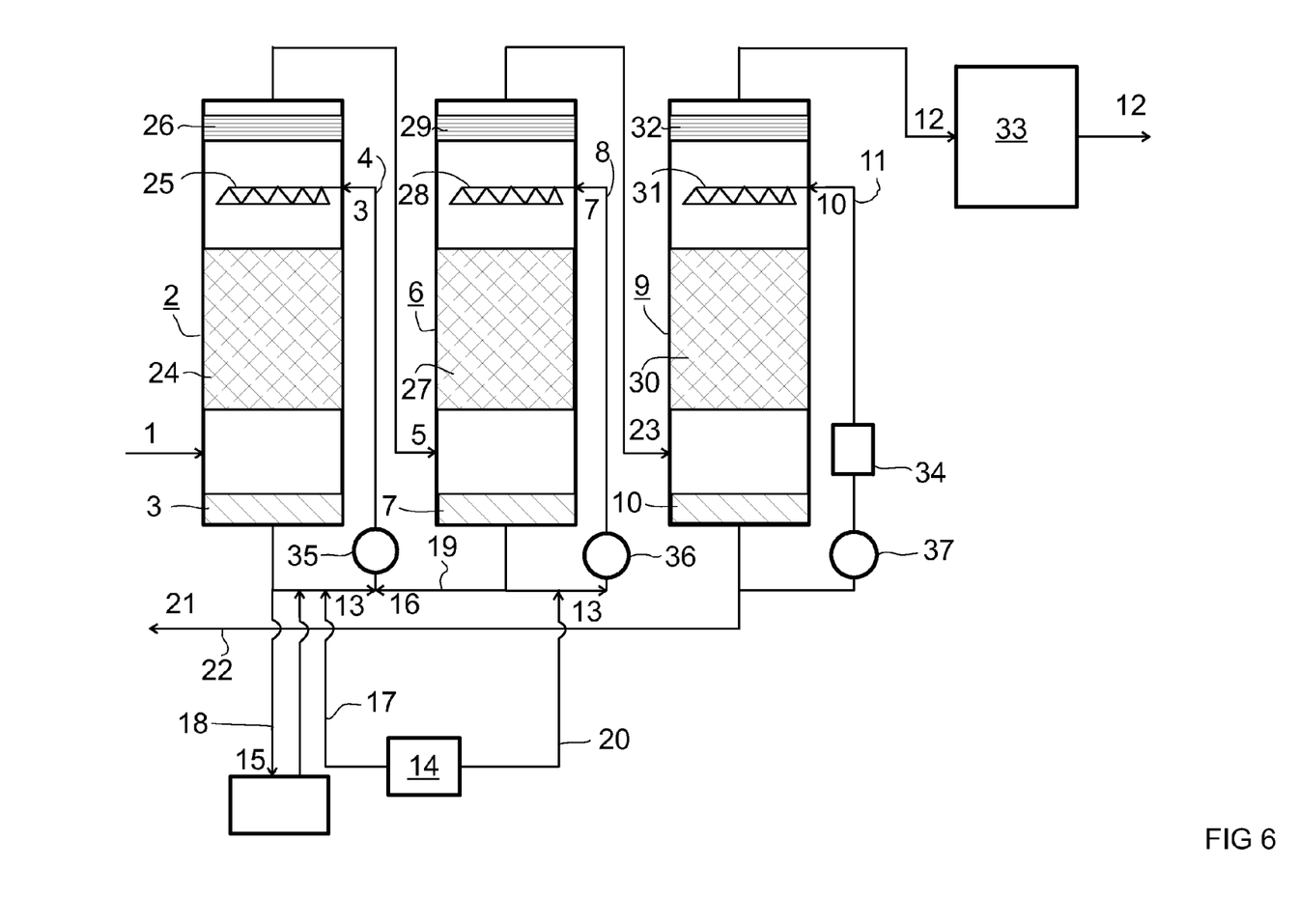
FIG. 6 is a schematic representation of a sixth embodiment of the arrangement.

In an embodiment of the method, such as in the embodiments illustrated in FIGS. 4 to 6, the method includes providing a first washing tower 2 comprising a first inlet (not marked with a reference numeral) for leading the stream of gas 1 into the first washing tower 2, a first outlet (not marked with a reference numeral) for leading the stream of once processed gas 5 from the first washing tower 2, first packing bodies 24, first nozzles 25 for injecting first washing solution 3 over the first packing bodies 24, and a first droplet separator 26 for preventing first washing solution 3 from being entrained with the stream of once processed gas 5 exiting the first washing tower 2. In this embodiment first washing solution 3 is collected at a bottom (not marked with a reference numeral) of the first washing tower 2 and first washing solution 3 is therefrom circulated in the first closed system 4.

In an embodiment of the method, such as in the embodiments illustrated in FIGS. 4 to 6, the, the method includes providing a second washing tower 6 comprising a second inlet (not marked with a reference numeral) for leading the stream of once processed gas 5 into the second washing tower 6, a second outlet (not marked with a reference numeral) for leading the stream of twice processed gas 23 from the second washing tower 6, second packing bodies 27, second nozzles 28 for injecting second washing solution 7 over the second packing bodies 27, and a second droplet separator 29 for preventing second washing solution 7 from being entrained with the stream of twice processed gas 23 exiting the second washing tower 6. In this embodiment second washing solution 7 is collected at a bottom (not marked with a reference numeral) of the second washing tower 6 and second washing solution 7 is therefrom circulated in the second closed system 8.

In an embodiment of the method, such as in the embodiments illustrated in FIGS. 4 to 6, the, the method includes providing a third washing tower 9 comprising a third inlet (not marked with a reference numeral) for leading the stream of twice processed gas 23 into the third washing tower 9, a third outlet (not marked with a reference numeral) for leading the stream of cleaned gas 12 from the third washing tower 9, third packing bodies 30, third nozzles 31 for injecting third washing solution 10 over the third packing bodies 30, and a third droplet separator 32 for preventing third washing solution 10 from being entrained with the stream of cleaned gas 12 exiting the third washing tower 9. In this embodiment third washing solution 10 is collected at a bottom (not marked with a reference numeral) of the third washing tower 9 and third washing solution 10 is therefrom circulated in the third closed system 11.

In the method the cleaned gas 12 may be brought to a filter 33 for absorption of any remaining gaseous elementary mercury. A filter 33 containing selenium and/or carbon can for example be used.

The method may comprise removing mercury from the third washing solution 10 circulating in the third closed system 11 by means of an active filter 34.

Next the arrangement for removing gaseous elementary mercury ($Hg^0_{(g)}$) from a stream of gas and some preferred embodiment and variants of the arrangement will be described in greater detail.

The arrangement comprises a first washing tower 2 for receiving a stream of gas 1.

The first washing tower 2 is configured for treating the stream of gas 1 with a first washing solution 3 that circulates in a first closed system 4 through the first washing tower 2 and that contains mercury (II) ions and possible additionally at least twice this amount of ion or ions selected from the group consisting of chlorine, bromine, iodine, cyanide and rhodanide ions. The mercury (II)-ion ($Hg^{2+}$) content in the first washing solution 3 may be decreased compared to a minimum often recommended level of about 1 to about 2 g/l, such as less than about 1.5 g/l, for the so-called Boliden-Norzink process but may be above a certain minimum level of about 0.1 to about 0.3 g/l, such as more than about 0.2 g/l. This will reduce the risk for formation of mercuric chloride ($Hg_2Cl_2$) mist or calomel mist in the gas.

The main reaction in this first washing stage is the following:

$$Hg^0(g) + HgCl^{n-}_{(2+n)} \rightarrow Hg_2Cl_2(s) + nCl^-, \text{ where } 0 \leq n \leq 2$$

The arrangement comprises a second washing tower 6 for receiving a stream of once processed gas 5 from the first washing tower 2.

The second washing tower 6 is configured for treating the stream of once processed gas 5 with a second washing solution 7 circulating in a second closed system 8 through the second washing tower 6 and that contains a higher concentration of mercury (II)-ions than the first washing solution 3 such as more than about 1 to 2 g/l, such more than about 1.5 g/l of mercury (II)-ions and that contains possible additionally at least twice this amount of ion or ions selected from the group consisting of chlorine, bromine, iodine, cyanide and rhodanide ions.

The main reaction in this second washing stage is the following:

$$Hg^0(g) + HgCl^{n-}_{(2+n)} \rightarrow Hg_2Cl_2(s) + nCl^-, \text{ where } 0 \leq n \leq 2$$

The arrangement comprises a third washing tower 9 for receiving a stream of twice processed gas 23 in the second washing tower 6.

The third washing tower 9 is configured for treating the stream of twice processed gas 23 with a third washing solution 10 circulating in a third closed system 11 through the third washing tower 9 and that contains a lower concentration of mercury (II)-ions than the first washing solution 3 such as less than about 0.1 to about 0.3 g/l, such as less than about 0.2 g/l, of mercury (II)-ions and that contains possible additionally at least twice this amount of ion or ions selected from the group consisting of chlorine, bromine, iodine, cyanide and rhodanide ions.

The main reaction in this third washing stage is the following:

$$HgCl_2(g) + H_2O \rightarrow HgCl_2(a)$$

The second washing tower 6 is configured for discharging a stream of cleaned gas 12 from the third washing tower 9.

The arrangement may comprise first feeding means 17 for additional washing solution 13 containing mercury (II)-ions from a tank means 14 into first washing solution 3 circulating in the first closed system 4.

The arrangement may comprise first removing means 18 for removing calomel 15 from the first washing solution 3 circulating in the first closed system 4.

The arrangement may comprise second feeding means 19 for feeding a part 16 of the second washing solution 7 circulating in the second closed system 8 into first washing solution 3 circulating in the first closed system 4.

The arrangement may comprise third feeding means 20 for feeding additional washing solution 13 containing mercury (II)-ions from a tank means 14 into second washing solution 7 circulating in the second closed system 8.

The arrangement may include fourth feeding means 22 for feeding third washing solution 21 circulating in the third closed system 11 to process steps (not shown in the figure) which are performed prior the method as described here. By such feeding, the amount of third washing solution 21 will be lower and it will be easier to maintain an optimal chemical composition of the third washing solution 21.

In an embodiment of the arrangement, such as in the embodiments shown in FIGS. 4 to 6, the first washing tower 2 comprises a first inlet (not marked with a reference numeral) for leading the stream of gas 1 into the first washing tower 2, a first outlet (not marked with a reference numeral) for leading the stream of once processed gas 5 from the first washing tower 2, first packing bodies 24, first nozzles 25 for injecting first washing solution 3 over the first packing bodies 24, and a first droplet separator 26 for preventing first washing solution 3 from being entrained with the stream of once processed gas 5 exiting the first washing tower 2. In this embodiment first washing solution 3 is configured to be collected at a bottom (not marked with a reference numeral) of the first washing tower 2 and first washing solution 3 is therefrom configured to be circulated in the first closed system 4.

In an embodiment of the arrangement, such as in the embodiments shown in FIGS. 4 to 6, the second washing tower 6 comprises a second inlet (not marked with a reference numeral) for leading the stream of once processed gas 5 into the second washing tower 6, a second outlet (not marked with a reference numeral) for leading the stream of twice processed gas 23 from the second washing tower 6, second packing bodies 27, second nozzles 28 for injecting second washing solution 7 over the second packing bodies 27, and a second droplet separator 29 for preventing second washing solution 7 from being entrained with the stream of twice processed gas 23 exiting the second washing tower 6. In this embodiment second washing solution 7 is configured to be collected at a bottom (not marked with a reference numeral) of the second washing tower 6 and second washing solution 7 is therefrom configured to be circulated in the second closed system 8.

In an embodiment of the arrangement, such as in the embodiments shown in FIGS. 4 to 6, the third washing tower 9 comprises a third inlet (not marked with a reference numeral) for leading the stream of twice processed gas 23 into the third washing tower 9, a third outlet (not marked with a reference numeral) for leading the stream of cleaned gas 12 from the third washing tower 9, third packing bodies 30, third nozzles 31 for injecting third washing solution 10 over the third packing bodies 30, and a third droplet separator 32 for preventing third washing solution 10 from being entrained with the stream of cleaned gas 12 exiting the third washing tower 9. In this embodiment third washing solution 10 is configured to be collected at a bottom (not marked with a reference numeral) of the third washing tower 9 and third washing solution 10 is therefrom configured to be circulated in the third closed system 11.

The arrangement may comprise a filter 33 for absorption of any remaining gaseous elementary mercury in the cleaned gas 12. The filter 33 may comprise selenium and/or carbon.

The third closed system 11 may be provided with an active filter 34 for removing mercury from the third washing solution 10 circulating in the third closed system 11.

The first closed system 4 of the arrangement illustrated in FIG. 6 comprises also a first pump 35 for circulating first washing solution 3 in the first closed system 4.

The second closed system 8 of the arrangement illustrated in FIG. 6 comprises also a second pump 36 for circulating second washing solution 7 in the second closed system 8.

The third closed system 11 of the arrangement illustrated in FIG. 6 comprises also a third pump 37 for circulating third washing solution 10 in the third closed system 11.

Next the arrangement for carrying out the method for removing gaseous elementary mercury from a stream of gas and some preferred embodiment and variants of the arrangement for carrying out the method will be described in greater detail.

The arrangement for carrying out the method comprises a first washing tower 2 for receiving a stream of gas 1.

The first washing tower 2 is configured for treating the stream of gas 1 with a first washing solution 3 that circulates in a first closed system 4 through the first washing tower 2 and that contains mercury (II) ions and possible additionally at least twice this amount of ion or ions selected from the group consisting of chlorine, bromine, iodine, cyanide and rhodanide ions. The mercury (II)-ion ($Hg^{2+}$) content in the first washing solution 3 may be decreased compared to a minimum often recommended level of about 1 to about 2 g/l, such as less than about 1.5 g/l, for the so-called Boliden-Norzink process but may be above a certain minimum level of about 0.1 to about 0.3 g/l, such as more than about 0.2 g/l. This will reduce the risk for formation of mercuric chloride ($Hg_2Cl_2$) mist or calomel mist in the gas.

The main reaction in this first washing stage is the following:

$Hg^0(g)+HgCl^{n-}_{(2+n)}->Hg_2Cl_2(s)+nCl^-$, where $0 \leq n \leq 2$

The arrangement for carrying out the method comprises a second washing tower 6 for receiving a stream of once processed gas 5 from the first washing tower 2.

The second washing tower 6 is configured for treating the stream of once processed gas 5 with a second washing solution 7 circulating in a second closed system 8 through the second washing tower 6 and that contains a higher concentration of mercury (II)-ions than the first washing solution 3 such as more than about 1 to 2 g/l, such more than about 1.5 g/l of mercury (II)-ions and that contains possible additionally at least twice this amount of ion or ions selected from the group consisting of chlorine, bromine, iodine, cyanide and rhodanide ions.

The main reaction in this second washing stage is the following:

$Hg^0(g)+HgCl^{n-}_{(2+n)}->Hg_2Cl_2(s)+nCl^-$, where $0 \leq n \leq 2$

The arrangement for carrying out the method comprises a third washing tower 9 for receiving a stream of twice processed gas 23 in the second washing tower 6.

The third washing tower 9 is configured for treating the stream of twice processed gas 23 with a third washing solution 10 circulating in a third closed system 11 through the third washing tower 9 and that contains a lower concentration of mercury (II)-ions than the first washing solution 3 such as less than about 0.1 to about 0.3 g/l, such as less than about 0.2 g/l, of mercury (II)-ions and that contains possible additionally at least twice this amount of ion or ions selected from the group consisting of chlorine, bromine, iodine, cyanide and rhodanide ions. The main reaction in this third washing stage is the following:

$HgCl_2(g)+H_2O->HgCl_2(a)$

The second washing tower 6 is configured for discharging a stream of cleaned gas 12 from the third washing tower 9.

The arrangement for carrying out the method may comprise first feeding means 17 for additional washing solution 13 containing mercury (II)-ions from a tank means 14 into first washing solution 3 circulating in the first closed system 4.

The arrangement for carrying out the method may comprise first removing means 18 for removing calomel 15 from the first washing solution 3 circulating in the first closed system 4.

The arrangement for carrying out the method may comprise second feeding means 19 for feeding a part 16 of the second washing solution 7 circulating in the second closed system 8 into first washing solution 3 circulating in the first closed system 4.

The arrangement for carrying out the method may comprise third feeding means 20 for feeding additional washing solution 13 containing mercury (II)-ions from a tank means 14 into second washing solution 7 circulating in the second closed system 8.

The arrangement for carrying out the method may include fourth feeding means 22 for feeding third washing solution 21 circulating in the third closed system 11 to process steps (not shown in the figure) which are performed prior the method as described here. By such feeding, the amount of third washing solution 21 will be lower and it will be easier to maintain an optimal chemical composition of the third washing solution 21.

In an embodiment of the arrangement for carrying out the method, such as in the embodiments shown in FIGS. 4 to 6, the first washing tower 2 comprises a first inlet (not marked with a reference numeral) for leading the stream of gas 1 into the first washing tower 2, a first outlet (not marked with a reference numeral) for leading the stream of once processed gas 5 from the first washing tower 2, first packing bodies 24, first nozzles 25 for injecting first washing solution 3 over the first packing bodies 24, and a first droplet separator 26 for preventing first washing solution 3 from being entrained with the stream of once processed gas 5 exiting the first washing tower 2. In this embodiment first washing solution 3 is configured to be collected at a bottom (not marked with a reference numeral) of the first washing tower 2 and first washing solution 3 is therefrom configured to be circulated in the first closed system 4.

In an embodiment of the arrangement for carrying out the method, such as in the embodiments shown in FIGS. 4 to 6, the second washing tower 6 comprises a second inlet (not marked with a reference numeral) for leading the stream of once processed gas 5 into the second washing tower 6, a second outlet (not marked with a reference numeral) for leading the stream of twice processed gas 23 from the second washing tower 6, second packing bodies 27, second nozzles 28 for injecting second washing solution 7 over the second packing bodies 27, and a second droplet separator 29 for preventing second washing solution 7 from being entrained with the stream of twice processed gas 23 exiting the second washing tower 6. In this embodiment second washing solution 7 is configured to be collected at a bottom (not marked with a reference numeral) of the second washing tower 6 and second washing solution 7 is therefrom configured to be circulated in the second closed system 8.

In an embodiment of the arrangement for carrying out the method, such as in the embodiments shown in FIGS. 4 to 6, the third washing tower 9 comprises a third inlet (not marked with a reference numeral) for leading the stream of twice processed gas 23 into the third washing tower 9, a third outlet (not marked with a reference numeral) for leading the stream of cleaned gas 12 from the third washing tower 9, third packing bodies 30, third nozzles 31 for injecting third washing solution 10 over the third packing bodies 30, and a third droplet separator 32 for preventing third washing solution 10 from being entrained with the stream of cleaned gas 12 exiting the third washing tower 9. In this embodiment third washing solution 10 is configured to be collected at a bottom (not marked with a reference numeral) of the third washing tower 9 and third washing solution 10 is therefrom configured to be circulated in the third closed system 11.

The arrangement for carrying out the method may comprise a filter 33 for absorption of any remaining gaseous elementary mercury in the cleaned gas 12. The filter 33 may comprise selenium and/or carbon.

The third closed system 11 may be provided with an active filter 34 for removing mercury from the third washing solution 10 circulating in the third closed system 11.

The first closed system 4 of the arrangement for carrying out the method illustrated in FIG. 6 comprises also a first pump 35 for circulating first washing solution 3 in the first closed system 4.

The second closed system 8 of the arrangement for carrying out the method illustrated in FIG. 6 comprises also a second pump 36 for circulating second washing solution 7 in the second closed system 8.

The third closed system 11 of the arrangement for carrying out the method illustrated in FIG. 6 comprises also a third pump 37 for circulating third washing solution 10 in the third closed system 11.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for removing gaseous elementary mercury from a stream of gas, wherein the method comprises
  (i) feeding the stream of gas into a first washing tower,
  (ii) treating the stream of gas in the first washing tower with a first washing solution that circulates in a first closed system through the first washing tower and that contains mercury (II)-ions to form a stream of once processed gas of the stream of gas,
  (iii) feeding the stream of once processed gas from the first washing tower into a second washing tower,
  (iv) treating the stream of once processed gas in the second washing tower with a second washing solution circulating in a second closed system through the second washing tower and that contains a higher concentration of mercury (II)-ions than the first washing solution form a stream of twice processed gas of the stream of once processed gas,
  (v) feeding the stream of twice processed gas from the second washing tower into a third washing tower,
  (vi) treating the stream of twice processed gas in the third washing tower with a third washing solution circulating in a third closed system through the third washing tower and that contains a lower concentration of mercury (II)-ions than the first washing solution to form a stream of cleaned gas of the stream of twice processed gas, and
  (vii) discharging the stream of cleaned gas from the third washing tower.

2. The method according to claim 1, further comprising feeding additional washing solution containing mercury (II)-ions from a tank means into first washing solution circulating in the first closed system.

3. The method according to claim 1, further comprising removing calomel from the first washing solution circulating in the first closed system.

4. The method according to claim 1, further comprising feeding a part of the second washing solution circulating in the second closed system into first washing solution circulating in the first closed system to remove calomel from the second washing solution.

5. The method according to claim 1, further comprising feeding additional washing solution containing mercury (II)-ions from a tank means into second washing solution circulating in the second closed system.

6. The method according to claim 1, wherein the cleaned gas is brought to a filter for absorption of any remaining gaseous elementary mercury.

7. The method according to claim 1, further comprising removing mercury from the third washing solution circulating in the third closed system by means of an active filter.

8. The method according to claim 1, wherein the first washing solution has a mercury (II)-ion content that is between about 0.1 g/l and about 2 g/l.

9. The method according to claim 1, wherein the first washing solution additionally contains an amount of ions selected from the group consisting of chlorine, bromine, iodine, cyanide and rhodanide ions, which said amount of ions is at least twice the amount of mercury (II)-ions.

10. The method according to claim 1, wherein the second washing solution has a mercury (II)-ion content that is more than about 3.0 g/l.

11. The method according to claim 1, wherein the second washing solution additionally contains an amount of ions selected from the group consisting of chlorine, bromine, iodine, cyanide and rhodanide ions, which said amount of ions is at least twice the amount of mercury (II)-ions.

12. The method according to claim 1, wherein the third washing solution has a mercury (II)-ion content that is less than about 0.3 g/l.

13. The method according to claim 1, wherein the third washing solution additionally contains an amount of ions selected from the group consisting of chlorine, bromine, iodine, cyanide and rhodanide ions, which said amount of ions is at least twice the amount of mercury (II)-ions.

14. An arrangement for removing gaseous elementary mercury from a stream of gas, wherein the arrangement comprises a first washing tower for receiving a stream of gas containing gaseous elementary mercury, wherein the first washing tower is configured for treating the stream of gas with a first washing solution that circulates in a first closed system through the first washing tower and that contains mercury (II) ions to form a stream of once processed gas of the stream of gas, a second washing tower for receiving a stream of once processed gas from the first washing tower, wherein the second washing tower is configured for treating the stream of once processed gas with a second washing solution circulating in a second closed system through the second washing tower and that contains a higher concentration of mercury (II)-ions than the first washing solution to form a stream of twice processed gas of the stream of once processed gas, a third washing tower for receiving a stream of twice processed gas from the second washing tower, wherein the third washing tower is configured for treating the stream of twice processed gas with a third washing solution circulating in a third closed system through the third washing tower and that contains a lower concentration of mercury (II)-ions than the first washing solution to form a stream of cleaned gas of the stream of twice processed gas, and wherein the third washing tower is configured for discharging a stream of cleaned gas from the third washing tower, and a filter for absorption of any remaining gaseous elementary mercury in the cleaned gas.

15. The arrangement according to claim 14, further comprising first feeding means for feeding additional washing solution containing mercury (II)-ions from a tank means into first washing solution circulating in the first closed system.

16. The arrangement according to claim 14, further comprising first removing means for removing calomel from the first washing solution circulating in the first closed system.

17. The arrangement according to claim 14, further comprising second feeding means for feeding a part of the second washing solution circulating in the second closed system into first washing solution circulating in the first closed system.

18. The arrangement according to claim 14, further comprising third feeding means for feeding additional washing solution containing mercury (II)-ions from a tank means into second washing solution circulating in the second closed system.

19. The arrangement according to claim 14, wherein the third closed system is provided with an active filter for removing mercury from the third washing solution circulating in the third closed system.

20. The arrangement according to claim 14, wherein the mercury (II)-ion content in the first washing solution is between about 0.1 g/l and about 2 g/l.

21. The arrangement according to claim 14, wherein the first washing solution additionally contains an amount of ions selected from the group consisting of chlorine, bromine, iodine, cyanide and rhodanide ions, which said amount of ions is at least twice the amount of mercury (II)-ions.

22. The arrangement according to claim 14, wherein the mercury (II)-ion content in the second washing solution is more than about 3.0 g/l.

23. The arrangement according to claim 14, wherein the second washing solution additionally contains an amount of ions selected from the group consisting of chlorine, bromine, iodine, cyanide and rhodanide ions, which said amount of ions is at least twice the amount of mercury (II)-ions.

24. The arrangement according to claim 14, wherein the mercury (II)-ion content in the third washing solution is less than about 0.3 g/l.

25. The arrangement according to claim 14, wherein the third washing solution additionally contains an amount of ions selected from the group consisting of chlorine, bromine, iodine, cyanide and rhodanide ions, which said amount of ions is at least twice the amount of mercury (II)-ions.

* * * * *